US011077800B2

(12) United States Patent
Anzai et al.

(10) Patent No.: US 11,077,800 B2
(45) Date of Patent: Aug. 3, 2021

(54) VEHICLE MIRROR HAVING IMAGE DISPLAY FUNCTION AND METHOD FOR PRODUCING THE SAME

(71) Applicant: FUJIFILM Corporation, Tokyo (JP)

(72) Inventors: Akihiro Anzai, Minamiashigara (JP); Kazuhiro Oki, Minamiashigara (JP); Mitsuyoshi Ichihashi, Minamiashigara (JP); Takao Taguchi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 340 days.

(21) Appl. No.: 15/987,139

(22) Filed: May 23, 2018

(65) Prior Publication Data

US 2018/0272950 A1 Sep. 27, 2018

Related U.S. Application Data

(63) Continuation of application No. PCT/JP2016/085792, filed on Dec. 1, 2016.

(30) Foreign Application Priority Data

Dec. 16, 2015 (JP) .............................. JP2015-244824

(51) Int. Cl.
*B60R 1/12* (2006.01)
*G02F 1/1335* (2006.01)
*G02B 5/30* (2006.01)
*G02B 27/28* (2006.01)
*G02F 1/13363* (2006.01)
*B60R 1/08* (2006.01)
*G02F 1/1333* (2006.01)

(52) U.S. Cl.
CPC .................. *B60R 1/12* (2013.01); *B60R 1/08* (2013.01); *G02B 5/305* (2013.01); *G02B 5/3083* (2013.01); *G02B 27/28* (2013.01); *G02F 1/13363* (2013.01); *G02F 1/133536* (2013.01); *B60R 2001/1215* (2013.01); *G02F 1/133331* (2021.01); *G02F 1/133533* (2013.01); *G02F 1/133541* (2021.01); *G02F 1/133545* (2021.01); *G02F 1/133548* (2021.01); *G02F 1/133638* (2021.01)

(58) Field of Classification Search
CPC .... G02B 5/3083; G02B 5/3033; G02B 5/305; G02B 5/3025; G02B 5/30; G02B 1/08; G02B 1/111; G02B 27/28; G02B 27/283; G02B 30/25; G02B 5/3016; G02B 27/281; G02B 5/0236; G02B 5/0257; G02B 5/0268; G02B 5/0284; G02B 5/3008; G02B 5/3041; G02F 1/133528; G02F 1/133536; G02F 1/133634; G02F 1/13363; G02F 2001/133531; G02F 2001/133635; G02F 2001/133545; G02F 1/0045; G02F 1/13; G02F 1/133365; G02F 2201/50
USPC ........ 359/290–292, 298, 302–304, 813, 815, 359/819–822
See application file for complete search history.

(56) References Cited

U.S. PATENT DOCUMENTS

| | | | | |
|---|---|---|---|---|
| 6,108,059 A | * | 8/2000 | Yang | G02B 6/0056 349/117 |
| 2003/0090012 A1 | * | 5/2003 | Allen | G02F 1/133536 264/1.31 |
| 2009/0002575 A1 | | 1/2009 | Yamada et al. | |
| 2009/0027600 A1 | * | 1/2009 | Hisatake | G02F 1/133536 349/98 |
| 2009/0079909 A1 | | 3/2009 | Ouderkirk et al. | |
| 2010/0220267 A1 | * | 9/2010 | Hatano | B32B 37/144 349/97 |
| 2010/0277786 A1 | * | 11/2010 | Anderson | G02F 1/0136 359/247 |
| 2011/0199362 A1 | * | 8/2011 | Katayama | G09G 3/3648 345/212 |

(Continued)

FOREIGN PATENT DOCUMENTS

| | | |
|---|---|---|
| JP | 55-59315 U | 4/1980 |
| JP | 9-506837 A | 7/1997 |

(Continued)

OTHER PUBLICATIONS

Japanese Decision of Refusal dated Dec. 10, 2019, for corresponding Japanese Application No. 2015-244824, with English translation.

(Continued)

*Primary Examiner* — Brandi N Thomas
(74) *Attorney, Agent, or Firm* — Birch, Stewart, Kolasch & Birch, LLP

(57) ABSTRACT

A vehicle mirror having an image display function includes an image display device, a circularly polarized light reflection layer, and a front plate formed of glass or plastic in this order. The circularly polarized light reflection layer includes a linearly polarized light reflection plate and a 1/4 wavelength plate from a side of the image display device. The linearly polarized light reflection plate and the 1/4 wavelength plate are directly in contact with each other, or only an alignment layer is included between the linearly polarized light reflection plate and the 1/4 wavelength plate. A method for producing the vehicle mirror includes forming the 1/4 wavelength plate from a composition that is directly applied to the surface of the linearly polarized light reflection plate or that is directly applied to the surface of the alignment layer directly in contact with the linearly polarized light reflection plate.

19 Claims, No Drawings

(56) References Cited

U.S. PATENT DOCUMENTS

| | | |
|---|---|---|
| 2014/0284583 A1 | 9/2014 | Saitoh et al. |
| 2015/0043073 A1 | 2/2015 | Sase et al. |

FOREIGN PATENT DOCUMENTS

| | | |
|---|---|---|
| JP | 2002-67806 A | 3/2002 |
| JP | 2004-6248 A | 1/2004 |
| JP | 2009-8881 A | 1/2009 |
| JP | 2010-105419 A | 5/2010 |
| JP | 2011-45427 A | 3/2011 |
| JP | 5046456 B2 | 10/2012 |
| JP | 2013-20135 A | 1/2013 |
| JP | 2014-26058 A | 2/2014 |
| JP | 2014-41274 A | 3/2014 |
| JP | 2014-201146 A | 10/2014 |
| JP | 2014-209219 A | 11/2014 |
| JP | 2014-219278 A | 11/2014 |
| JP | 2015-57648 A | 3/2015 |
| WO | WO 01/22130 A1 | 3/2001 |

OTHER PUBLICATIONS

Japanese Notification of Reasons for Refusal for Japanese corresponding Application No. 2015-244824, dated Apr. 2, 2019, with English translation.

International Preliminary Report on Patentability and Written Opinion of the International Searching Authority (forms PCT/IB/373, PCT/ISA/237 and PCT/IB/326), dated Jun. 28, 2018, for corresponding International Application No. PCT/JP2016/085792, with an English translation of the Written Opinion.

International Search Report (form PCT/ISA/210), dated Feb. 14, 2017, for corresponding International Application No. PCT/JP2016/085792, with an English translation.

* cited by examiner

VEHICLE MIRROR HAVING IMAGE DISPLAY FUNCTION AND METHOD FOR PRODUCING THE SAME

CROSS-REFERENCE TO RELATED APPLICATIONS

This application is a Continuation of PCT International Application No. PCT/JP2016/085792 filed on Dec. 1, 2016, which claims priority under 35 U.S.C § 119(a) to Japanese Patent Application No. 2015-244824 filed on Dec. 16, 2015. Each of the above application(s) is hereby expressly incorporated by reference, in its entirety, into the present application.

BACKGROUND OF THE INVENTION

1. Field of the Invention

The present invention relates to a vehicle mirror having an image display function and a method for producing the vehicle mirror having an image display function.

2. Description of the Related Art

A vehicle mirror having an image display function, which is a vehicle mirror that can display images, such as images taken by an onboard camera, is described, for example, in JP2014-201146A.

SUMMARY OF THE INVENTION

As described in JP2014-201146A, the vehicle mirror having an image display function has a liquid crystal display device disposed in the housing of the vehicle mirror, and images are displayed through a half mirror disposed on the front surface of the vehicle mirror, thereby achieving an image display on the vehicle mirror. However, a half mirror typically has a visible light transmittance of about 30% to 70%. Thus, the vehicle mirror having a structure in which a half mirror is disposed has a potential problem in which images are displayed darker than that of vehicle mirrors having no half mirrors.

On the other hand, JP2011-45427A discloses a mirror having an information display function, used for interior decoration, makeup, crime prevention, and security. It is described in the description that light loss can be eliminated by using a reflective polarizing plate as a half mirror. However, in a structure in which a reflective polarizing plate is used as a half mirror, images and mirror-reflected images cannot be recognized in some directions when images are observed through polarizing sunglasses. Thus, the structure is not suitable for vehicle use.

An object of the present invention is to provide a vehicle mirror having an image display function, which enables observation of images and mirror-reflected images without direction dependency even when the observation is performed through polarizing sunglasses and display of bright images and bright mirror-reflected images, both with slight distortion, and a method for producing the vehicle mirror having an image display function.

The present inventors have conducted various investigations on the aforementioned half mirrors to solve the aforementioned problems and achieved the present invention.

In other words, the present invention provides the following [1] to [13].

[1] A vehicle mirror having an image display function, including:
an image display device, a circularly polarized light reflection layer, and a front plate formed of glass or plastic in this order,
wherein the circularly polarized light reflection layer includes a linearly polarized light reflection plate and a 1/4 wavelength plate from a side of the image display device, and
the linearly polarized light reflection plate and the 1/4 wavelength plate are directly in contact with each other, or only an alignment layer is included between the linearly polarized light reflection plate and the 1/4 wavelength plate.

[2] The vehicle mirror having an image display function according to [1], wherein the linearly polarized light reflection plate and the 1/4 wavelength plate are directly in contact with each other.

[3] The vehicle mirror having an image display function according to [1], wherein only an alignment layer is included between the linearly polarized light reflection plate and the 1/4 wavelength plate.

[4] The vehicle mirror having an image display function according to any one of [1] to [3], wherein the linearly polarized light reflection plate has a multilayer structure.

[5] The vehicle mirror having an image display function according to [4], wherein the multilayer structure is a multilayer structure in which resins having different birefringence are layered alternately.

[6] The vehicle mirror having an image display function according to [4], wherein the multilayer structure is a multilayer structure in which a plurality of dielectric thin films having refractive indices different from each other are layered.

[7] The vehicle mirror having an image display function according to any one of [1] to [6], wherein the image display device and the circularly polarized light reflection layer are directly bonded to each other with an adhesion layer disposed therebetween.

[8] The vehicle mirror having an image display function according to any one of [1] to [7], wherein the front plate and the circularly polarized light reflection layer are directly bonded to each other with an adhesion layer disposed therebetween.

[9] The vehicle mirror having an image display function according to any one of [1] to [8], wherein the vehicle mirror having an image display function is a vehicle rearview mirror.

[10] A method for producing a vehicle mirror having an image display function, the vehicle mirror including an image display device, a circularly polarized light reflection layer, and a front plate formed of glass or plastic in this order,
wherein the circularly polarized light reflection layer includes a linearly polarized light reflection plate and a 1/4 wavelength plate from a side of the image display device, and
the method includes forming the 1/4 wavelength plate from a composition that is applied directly to a surface of the linearly polarized light reflection plate or that is applied directly to a surface of an alignment layer directly in contact with the linearly polarized light reflection plate.

[11] The producing method according to [10], including performing rubbing treatment to the surface of the linearly polarized light reflection plate or to the surface of the alignment layer directly in contact with the linearly polarized light reflection plate before the application.

[12] The producing method according to [10], including forming the 1/4 wavelength plate from a composition applied directly to a surface of the linearly polarized light reflection plate and performing rubbing treatment to the surface of the linearly polarized light reflection plate before the application.

[13] The producing method according to any one of [10] to [12], wherein the composition is a liquid crystal composition including a polymerizable liquid crystal compound.

The present invention provides a novel vehicle mirror having an image display function and a method for producing the novel vehicle mirror. The vehicle mirror having an image display function according to the present invention enables observation of images and mirror-reflected images without direction dependency even when the observation is performed through polarizing sunglasses and provides bright images and bright mirror-reflected images, both with slight distortion.

DESCRIPTION OF THE PREFERRED EMBODIMENTS

Hereinafter, the present invention will be described in detail.

It is noted that, in the present specification, "to" be used to include a number described therebefore as a lower limit and a number described thereafter as an upper limit. In the present specification, expressions of an angle, for example, "45°", "parallel", "perpendicular", "orthogonal", and the like mean that the angle is within the exact angle ±less than 5°, unless otherwise specified. A difference from the exact angle is preferably ±less than 4° and more preferably ±less than 3°.

Visible light is light having a wavelength that people can see in electromagnetic waves and refers to light in a wavelength range of 380 nm or more and less than 780 nm. Infrared rays (infrared light) are electromagnetic waves in a wavelength range greater than that of visible light and less than that of radio waves. In infrared rays, near infrared light refers to electromagnetic waves in a wavelength range of 780 nm or more and less than 2500 nm.

In the present specification, regarding a mirror having an image display function, the term "image" refers to an image seen and observed from the front-plate side when the image display unit of an image display device displays the image. In the present specification, regarding a mirror having an image display function, the term "mirror-reflected image" refers to an image seen and observed from the front-plate side when the image display unit of an image display device displays no images.

In the present specification, the front phase difference is measured with an AxoScan (manufactured by Axometrix). The measuring wavelength is set to 550 nm, unless otherwise specified. The front phase difference may be a measurement obtained by irradiating a film with light having a wavelength within a visible light wavelength range, such as a center wavelength of the selective reflection band of a cholesteric liquid crystal layer, in a normal direction to the film in KOBRA 21ADH or WR (manufactured by Oji Scientific Instruments). When a measuring wavelength is selected, wavelength selecting filters may be manually changed to obtain a measurement, or the measurement may be obtained by performing conversion by using, for example, a program.

Vehicle Mirror Having Image Display Function

The vehicle mirror having an image display function may be used as, for example, a vehicle rearview mirror (inner mirror). In the present description, the term "vehicle mirror having an image display function" may be referred to as "mirror having an image display function".

The vehicle mirror having an image display function according to the present invention includes an image display device, a circularly polarized light reflection layer, and a front plate in this order. In the present specification, in the mirror having an image display function, a structure including the circularly polarized light reflection layer and the front plate may be referred to as a half mirror. In the mirror having an image display function, the image display device and the half mirror may be directly in contact with each other. An air space may be present between the image display device and the half mirror, or the image display device and the half mirror may be bonded to each other with an adhesion layer disposed therebetween.

In the present specification, the surface on the side of the front plate opposite to the circularly polarized light reflection layer may be referred to as a front surface.

It is only required that at least a portion of the image display unit of the image display device adhere to the circularly polarized light reflection layer. The area of the surface of the circularly polarized light reflection layer that adheres to the image display unit may be larger or smaller than or equal to the area of the image display unit.

The front plate may be larger or smaller than or equal to the circularly polarized light reflection layer. The circularly polarized light reflection layer adheres to a portion of the front plate, and other types of reflecting layers, such as metal foil, may adhere to or may be formed on another portion. Such a structure enables image display in a portion of the mirror. On the other hand, the circularly polarized light reflection layer may adhere to the entire surface of the front plate and further may adhere to the image display unit of the image display device in which the image display unit has an area the same as that of the circularly polarized light reflection layer. This structure enables image display in the entire mirror surface. The vehicle mirror having an image display function according to the present invention preferably enables image display in the entire mirror surface.

Image Display Device

The image display device is not particularly limited. The image display device is preferably an image display device that emits (radiates) linearly polarized light to form images and more preferably a liquid crystal display device.

The liquid crystal display device may be of transmissive type or reflective type. In particular, the transmissive type is preferred. The liquid crystal display device may be an in plane switching (IPS) mode, fringe field switching (FFS) mode, vertical alignment (VA) mode, electrically controlled birefringence (ECB) mode, super twisted nematic (STN) mode, twisted nematic (TN) mode, or optically compensated bend (OCB) mode liquid crystal display device. When the power is off, the image display device preferably has an average reflectivity of 30% or more for visible light having a wavelength of 380 nm or more and less than 780 nm and more preferably 40% or more. It is only required that when the power is off, visible light reflection in the image display device be provided by a component of the image display device (e.g., a reflective polarizing plate or a backlight unit).

Images displayed in the image display unit of the image display device may be still images, moving images, or just alphabetic information. Images may be monocolor images, such as black and white, multicolor images, or full color images.

Circularly Polarized Light Reflection Layer

The circularly polarized light reflection layer in the mirror having an image display function functions as a semi-transmissive semi-reflective layer. In other words, when images are displayed, the circularly polarized light reflection layer transmits light emitted from the image display device to display images in the front surface of the mirror having an image display function. On the other hand, when images are not displayed, the circularly polarized light reflection layer reflects incident light coming from a front-plate direction to allow the front surface of the mirror having an image display function to be a mirror.

In the vehicle mirror having an image display function according to the present invention, the circularly polarized light reflection layer is used in a half mirror. Thus, the vehicle mirror can reflect incident light coming from the front-plate side as circularly polarized light and transmit incident light from the image display device as circularly polarized light. Thus, in the mirror having an image display function according to the present invention, images and mirror-reflected images can be observed even through polarizing sunglasses, regardless of a relation between a transmission axis direction of the polarizing sunglasses and a horizontal direction of the mirror having an image display function.

The circularly polarized light reflection layer includes a linearly polarized light reflection plate and a 1/4 wavelength plate. The circularly polarized light reflection layer may include an alignment layer.

In the circularly polarized light reflection layer, the linearly polarized light reflection plate and the 1/4 wavelength plate are disposed such that the slow axis of the 1/4 wavelength plate is angled at 45° relative to the polarized light reflection axis of the linearly polarized light reflection plate. The linearly polarized light reflection plate and the 1/4 wavelength plate are directly in contact with each other, or only an alignment layer is included between the linearly polarized light reflection plate and the 1/4 wavelength plate. The present inventors found that allowing the linearly polarized light reflection plate and the 1/4 wavelength plate to be placed directly in contact with each other without, for example, an adhesion layer disposed therebetween or allowing only an alignment layer to be included between the linearly polarized light reflection plate and the 1/4 wavelength plate, that is, making a structure in which another layer such as an adhesion layer is not included between the linearly polarized light reflection plate and the 1/4 wavelength plate results in obtaining mirror-reflected images and images with slight distortion in the mirror having an image display function.

When the circularly polarized light reflection layer is disposed such that the linearly polarized light reflection plate is placed near the image display device, light that come from the image display device and that is used for image display can effectively be converted into circularly polarized light and the resultant light can be emitted from the front surface of the vehicle mirror having an image display function. When the light that comes from the image display device and that is used for an image display is linearly polarized light, the polarized light reflection axis of the linearly polarized light reflection plate may be adjusted such that the linearly polarized light is transmitted.

The circularly polarized light reflection layer preferably has a film thickness in a range of 2.0 μm to 300 μm and more preferably in a range of 8.0 to 200 μm.

Linearly Polarized Light Reflection Plate

The linearly polarized light reflection plate is a polarizing plate that has a wavelength range in which light linearly polarized in a specific-transmission-axis direction is selectively reflected and in which light linearly polarized in a transmission-axis direction, which is orthogonal to the specific-transmission-axis direction, is selectively transmitted, in a visible light range.

Examples of such a linearly polarized light reflection plate include (i) a dielectric multilayer film, (ii) a polarizer in which resins having different birefringence are layered, and (iii) a wire-grid type polarizer.

(i) The dielectric multilayer film may be a multilayer film in which a plurality of dielectric materials having different refractive indices are deposited on a support in an oblique direction by vacuum vapor deposition or sputtering.

In order to make a wavelength-selective reflective film having a linearly polarized light function, optically anisotropic dielectric thin films and optically isotropic dielectric thin films are preferably layered alternately. This can be produced by, for example, depositing layers on a support alternately in an oblique direction and in a vertical direction. The deposition may be performed with a single material or two or more materials. The number of deposited layers is preferably 10 layers to 500 layers and more preferably 50 layers to 300 layers. Examples of the deposited materials include $Ta_2O_5$, $TiO_2$, $SiO_2$, and $LaTiO_3$.

The film forming method of the dielectric multilayer film is not particularly limited and can be selected appropriately depending on purposes. Examples of such film forming methods include vacuum vapor deposition, such as ion plating and ion beaming, a physical vapor deposition (PVD), such as sputtering, and a chemical vapor deposition (CVD). In these methods, vacuum vapor deposition and sputtering are preferable, and sputtering is particularly preferable.

In sputtering, DC sputtering is preferable, which has a high film forming rate.

(ii) The polarizer in which resins having different birefringence are layered may be, for example, the polarizer described in JP1997-506837A (JP-H09-506837A).

Specifically, a wide variety of materials can be used to form polarizers when processed under conditions selected to obtain the desired refractive index relationships. It is typically needed that one of first materials has a refractive index different from that of a second material in a selected direction. This difference in refractive indices can be achieved in a variety of ways, including stretching during or after film formation, extrusion molding, or coating. Furthermore, in order to extrude two materials simultaneously, the materials preferably have similar rheological properties (e.g., melt viscosity).

The polarizer in which resins having different birefringence are layered may be a marketed product, which may be, for example, DBEF (registered trademark) (manufactured by 3M).

(iii) The wire-grid type polarizer is a polarizer in which one polarized light component is transmitted and the other component is reflected in response to birefringence of fine metal wires.

A wire-grid type polarizer is obtained by arranging metal wires periodically and is mainly used as a polarizer in Terahertz wave band. In order for a wire grid to function as a polarizer, it is necessary that intervals between wires be sufficiently smaller than the wavelength of an incident electromagnetic wave.

In the wire-grid type polarizer, metal wires are arranged at regular intervals. A polarized light component in which the polarizing direction is parallel to the longitudinal direction of the metal wires is reflected by the wire-grid type polarizer, and a polarized light component in which the polarizing direction is perpendicular to the longitudinal direction passes through the wire-grid type polarizer.

The wire-grid type polarizer may be a marketed product. The marketed product may be, for example, a wire grid polarizing filter 50×50, NT46-636 manufactured by Edmund Optics Inc.

1/4 Wavelength Plate

It is only required that the 1/4 wavelength plate be a phase difference layer that functions as a 1/4 wavelength plate in a visible light range and the front phase difference of the 1/4 wavelength plate is the same as a quarter of the emission wavelength of the image display device. Therefore, for example, in the case where the image display device has an emission wavelength of 450 nm, 530 nm, and 640 nm, the 1/4 wavelength plate is most preferably a phase difference layer having such reverse dispersibility that a phase difference is 112.5 nm±10 nm, preferably 112.5 nm±5 nm, and more preferably 112.5 nm at a wavelength of 450 nm, 132.5 nm±10 nm, preferably 132.5 nm±5 nm, and more preferably 132.5 nm at a wavelength of 530 nm, and 160 nm±10 nm, preferably 160 nm±5 nm, and more preferably 160 nm at a wavelength of 640 nm. The 1/4 wavelength plate may be a phase difference plate having low wavelength dispersibility of phase difference or a phase difference plate having forward dispersibility. It is noted that reverse dispersibility refers to a property in which the absolute value of the phase difference increases with increasing wavelength, and forward dispersibility refers to a property in which the absolute value of the phase difference increases with decreasing wavelength.

The 1/4 wavelength plate may be formed by arranging and fixing polymerizable liquid crystal compounds and polymeric liquid crystal compounds. For example, the 1/4 wavelength plate can be formed, as described later, by applying a liquid crystal composition to the surface of a linearly polarized light reflection plate or to the surface of an alignment layer on the surface of a linearly polarized light reflection plate, aligning the polymerizable liquid crystal compound in the liquid crystal composition in a nematic alignment in a liquid crystal state, and fixing the resultant compound by photo-crosslinking or thermal-crosslinking. The 1/4 wavelength plate may be a layer obtained by applying a composition including a polymeric liquid crystal compound to the surface of a linearly polarized light reflection plate or to the surface of an alignment layer on the surface of a linearly polarized light reflection plate, aligning the composition in a nematic alignment in a liquid crystal state, and then performing cooling to fix the alignment.

Method for Producing Circularly Polarized Light Reflection Layer: Method for Forming 1/4 Wavelength Plate The circularly polarized light reflection layer can be produced by forming a 1/4 wavelength plate on a linearly polarized light reflection plate. The 1/4 wavelength plate is formed from a composition that is applied directly to the surface of a linearly polarized light reflection plate or that is applied to the surface of an alignment layer on the surface of a linearly polarized light reflection plate. Examples of such a composition include a composition including a polymeric liquid crystal compound and a liquid crystal composition including a polymerizable liquid crystal compound. The liquid crystal composition including a polymerizable liquid crystal compound is preferable.

The liquid crystal composition may further include, for example, a surfactant or a polymerization initiator, if necessary. The liquid crystal composition to which a solvent or the like is added when needed is applied and, after matured in alignment, is cured to be fixed to thereby form a 1/4 wavelength plate.

Polymerizable Liquid Crystal Compound

The polymerizable liquid crystal compound may be a rod-like liquid crystal compound.

The rod-like polymerizable liquid crystal compound may be a rod-like nematic liquid crystal compound. Preferable examples of such a rod-like nematic liquid crystal compound include azomethines, azoxys, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexylbenzonitriles. Not only low molecular liquid crystal compounds but also polymeric liquid crystal compounds may be used.

The polymerizable liquid crystal compound is obtained by introducing a polymerizable group into a liquid crystal compound. Examples of such a polymerizable group include an unsaturated polymerizable group, an epoxy group, and an aziridinyl group. An unsaturated polymerizable group is preferable, and an ethylenically unsaturated polymerizable group is particularly preferable. A polymerizable group may be introduced into a liquid crystal compound molecule with various ways. The number of polymerizable groups included in the polymerizable liquid crystal compound is preferably 1 to 6, more preferably 1 to 3. Examples of the polymerizable liquid crystal compound include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-328973A. Two or more polymerizable liquid crystal compounds may be used in combination. The use of two or more polymerizable liquid crystal compounds may contribute to a decrease in the alignment temperature.

The amount of the polymerizable liquid crystal compound added to the liquid crystal composition is preferably 80 mass % to 99.9 mass %, more preferably 85 mass % to 99.5 mass %, and particularly preferably 90 mass % to 99 mass % relative to the solid content mass of the liquid crystal composition (mass excluding the mass of the solvent).

Polymerization Initiator

The liquid crystal composition preferably includes a polymerization initiator. In an aspect in which a polymerization proceeds under ultraviolet irradiation, a polymerization initiator to be used is preferably a photopolymerization initiator capable of initiating a polymerization by ultraviolet irradiation. Examples of such a photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), a combination of triarylimidazole dimer and p-aminophenyl ketone (described in U.S. Pat. No. 3,549,367A), acridine and phenazine compounds (described in JP1985-105667A (JP- S60-105667A) and U.S. Pat. No. 4,239,850A), and oxadiazole compounds (described in U.S. Pat. No. 4,212,970A).

The content of the photopolymerization initiator in the liquid crystal composition is preferably 0.1 mass % to 20 mass % and more preferably 0.5 mass % to 5 mass % relative to the content of the polymerizable liquid crystal compound.

Crosslinking Agent

The liquid crystal composition may arbitrarily include a crosslinking agent to improve the film strength after curing and the durability. As the crosslinking agent, a material which is curable by ultraviolet rays, heat, moisture, or the like can be suitably used.

The crosslinking agent is not particularly limited and can be appropriately selected depending on purposes. Examples thereof include polyfunctional acrylate compounds, such as trimethylolpropane tri(meth)acrylate and pentaerythritol tri(meth)acrylate; epoxy compounds, such as glycidyl methacrylate and ethylene glycol diglycidyl ether; aziridine compounds, such as 2,2-bishydroxymethylbutanol-tris[3-(1-aziridinyl)propionate] and 4,4-bis(ethyleneiminocarbonylamino)diphenylmethane; isocyanate compounds, such as hexamethylene diisocyanate and biuret-type isocyanate; polyoxazoline compounds having an oxazoline group in a side chain; and alkoxysilane compounds such as vinyltrimethoxysilane and N-(2-aminoethyl)-3-aminopropyltrimethoxysilane. A known catalyst can be used depending on the reactivity of the crosslinking agent, and the use of the known catalyst improve productivity in addition to the improvement of the film thickness and the durability. These may be used alone or in a combination of two or more thereof.

The content of the crosslinking agent is preferably 3 mass % to 20 mass % and more preferably 5 mass % to 15 mass %. When the content of the crosslinking agent is 3 mass % or more, an effect of improving crosslinking density can be obtained, and when the content of the crosslinking agent is 20 mass % or less, stability of a layer to be formed can be maintained.

Alignment Controlling Agent

An alignment controlling agent that contributes to stable or rapid planar alignment may be added to the liquid crystal composition. Examples of the alignment controlling agent include fluorine (meth)acrylate-based polymers described in paragraphs [0018] to [0043] in JP2007-272185A and compounds represented by Formulae (I) to (IV) described in, for example, paragraphs [0031] to [0034] in JP2012-203237A.

The alignment controlling agent may be used alone or in a combination of two or more thereof.

The amount of the alignment controlling agent added to the liquid crystal composition is preferably 0.01 mass % to 10 mass %, more preferably 0.01 mass % to 5 mass %, and particularly preferably 0.02 mass % to 1 mass % relative to the total mass of the polymerizable liquid crystal compound.

Other Additives

The liquid crystal composition may include at least one selected from the group consisting of various additives, such as a surfactant for making the film thickness uniform by adjusting the surface tension of the coating film and a polymerizable monomer. Furthermore, if necessary, a polymerization inhibitor, an antioxidant, an ultraviolet absorber, a light stabilizer, a coloring material, a metal oxide fine particle, or the like can be added to the liquid crystal composition, provided that the optical performance is not decreased.

Solvent

The solvent used to prepare the liquid crystal composition is not particularly limited and can be appropriately selected depending on purposes. An organic solvent is preferably used.

The organic solvent is not particularly limited and can be appropriately selected depending on purposes. Examples thereof include ketones, alkyl halides, amides, sulfoxides, heterocyclic compounds, hydrocarbons, esters, and ethers. These may be used alone or in a combination of two or more thereof. Among these compounds, ketones are particularly preferable in consideration of environmental loads.

Application, Alignment, Polymerization

A method for applying the liquid crystal composition to the surface of a linearly polarized light reflection plate or to the surface of an alignment layer on the surface of a linearly polarized light reflection plate is not particularly limited and can be appropriately selected depending on purposes. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. The coating can also be performed by transferring a liquid crystal composition that has been separately applied to a support. The liquid crystal molecules are aligned by heating the liquid crystal composition that has been applied. The liquid crystal molecules are preferably aligned in a nematic alignment. The heating temperature is preferably 50° C. to 120° C. and more preferably 60° C. to 100° C.

The aligned liquid crystal compound can be further polymerized to be cured. The polymerization may be any one of thermal polymerization and photopolymerization by light irradiation and is preferably photopolymerization. Ultraviolet rays are preferably used for the light irradiation. The irradiation energy is preferably 20 mJ/cm$^2$ to 50 J/cm$^2$ and more preferably 100 mJ/cm$^2$ to 1500 mJ/cm$^2$. In order to promote the photopolymerization, the light irradiation may be performed under a heating condition or in a nitrogen atmosphere. The wavelength of ultraviolet rays for the irradiation is preferably 350 nm to 430 nm. From the viewpoint of stability, the rate of polymerization is preferably high. The rate of polymerization is preferably 70% or more and more preferably 80% or more. The rate of polymerization can be determined by measuring the consumption rate of a polymerizable functional group with an infrared (IR) absorption spectrum.

The thickness of the 1/4 wavelength plate formed of the liquid crystal composition is not particularly limited. The thickness is preferably 0.2 μm to 10 μm and more preferably 0.5 μm to 2 μm.

Alignment Layer

The liquid crystal composition may be applied to an alignment layer.

The alignment layer can be provided by means of rubbing treatment of an organic compound such as a polymer (a resin such as a polyimide, a polyvinyl alcohol, a polyester, a polyarylate, a polyamideimide, a polyether imide, a polyamide, and a modified polyamide), oblique vapor deposition of an inorganic compound, formation of a layer having microgrooves, or accumulation of an organic compound (e.g., ω-tricosanoic acid, dioctadecylmethylammonium chloride, or methyl stearate) by the Langmuir-Blodgett method (LB film). Furthermore, an alignment layer that obtains an alignment function by application of an electric field or a magnetic field or by irradiation with light may be used. In particular, the optical alignment layer is preferably used.

Hereinafter, a process of producing the optical alignment layer will be described in detail.

1) Process of Forming Optical Alignment Layer by Applying Composition for Optical Alignment Layer to Linearly Polarized Light Reflection Plate Optical alignment materials used for a composition for the optical alignment layer in the present process are described in many descriptions. In the present aspect, for example, preferable examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photoalignable units described in JP2002-265541A and JP2002-317013A, photo-crosslinkable silane derivatives described in JP4205195B, JP4205198B, and photo-crosslinkable polyimides, polyamides, or esters described in JP2003-520878A, JP2004-529220A, and JP4162850B. The azo compounds, the photo-crosslinkable polyimides, the polyamides, and the esters are particularly preferable.

A composition for the optical alignment layer is preferably prepared as a coating liquid. A method for coating is not particularly limited. After the coating liquid is applied, if desired, heating, solvent removing, and drying are performed to thereby form the optical alignment layer.

2) Process of Forming Pattern Alignment Layer by Pattern-Exposing Optical Alignment Layer Placed under Photo Mask with Polarized Light in Direction at 45° to Polarizing Direction of Linearly Polarized Light Reflection Plate and Allowing Exposing Portion of Optical Alignment Layer to Exhibit Alignability in Direction at 45° to Polarizing Direction of Linearly Polarized Light Reflection Plate In this process, while the support is being pressed against a photo mask, the optical alignment layer is subjected to pattern exposure. The wavelength of polarized light used in the process is different depending on optical alignment materials used and is not particularly limited if needed for the optical reaction. Light used for light irradiation preferably has a peak wavelength of 200 nm to 700 nm. Ultraviolet light having a peak wavelength of 400 nm or less is more preferable.

Examples of the light sources include commonly used light sources, for example, lamps, such as tungsten lamps, halogen lamps, xenon lamps, xenon flash lamps, mercury lamps, mercury xenon lamps, and carbon arc lamps, various lasers (e.g., semiconductor lasers, helium-neon lasers, argon ion lasers, helium cadmium lasers, and YAG lasers), light-emitting diodes, and cathode-ray tubes.

Examples of means used to obtain linearly polarized light by using a photo mask include a method of using a polarizing plate (e.g., an iodine polarizing plate, a dichroic dye polarizing plate, or a wire grid polarizing plate), a method of using a prism element (e.g., a Glan-Thomson prism) or a reflection-type polarizer utilizing Brewster angle, and a method of using light that is emitted from a laser light source and that has polarization. Light having only a necessary wavelength may be selectively emitted by using, for example, a filter or a wavelength-converting element.

When irradiation with linearly polarized light is performed, a method of irradiating the upper or rear surface of an alignment layer perpendicularly or obliquely is employed. The incidence angle of the light differs depending on the optical alignment materials, for example, 0 to 90° (perpendicular) and preferably 40° to 90°. The irradiation time is preferably 1 minute to 60 minutes and more preferably 1 minute to 10 minutes.

The alignment layer preferably has a thickness of 0.01 μm to 5 μm, more preferably 0.03 μm to 2 μm, and further more preferably 0.05 μm to 1 μm.

Rubbing Treatment

When the liquid crystal composition is applied to the surface of a linearly polarized light reflection plate, the surface of the linearly polarized light reflection plate is preferably subjected to rubbing treatment. It is preferable that the alignment layer formed of a polymer be subjected to rubbing treatment and then the liquid crystal composition be applied to the rubbing-treated surface. The rubbing treatment can be performed by rubbing the surface of the polymer layer with paper or cloth in a certain direction for several times.

A typical rubbing treatment is described in, for example, "Handbook of Liquid Crystals" (published by Maruzen Company, Limited, Oct. 30, 2000).

The rubbing density can be changed by the method described in "Handbook of Liquid Crystals" (published by Maruzen Company, Limited). The rubbing density (L) is quantified by the following equation (A).

$$L = Nl(1+2\pi rn/60v) \qquad \text{Equation (A)}$$

In Equation (A), N denotes the number of rubbing cycles, l denotes the contact length of a rubbing roller, r denotes the radius of the roller, n denotes the number of rotations of the roller (rpm), and v denotes the moving speed of a stage (per second).

In order to increase the rubbing density, the number of rubbing cycles, the contact length of the rubbing roller, the radius of the roller, or the number of rotations of the roller may be increased, or the moving speed of the stage may be decreased. On the other hand, in order to decrease the rubbing density, the above operation may be performed in the opposite way.

It is possible to consult JP4052558B for the conditions of the rubbing treatment.

Front Plate

The vehicle mirror having an image display function according to the present invention has a front plate. The front plate may be directly in contact with the circularly polarized light reflection plate, or may be bonded with, for example, an adhesion layer directly to the circularly polarized light reflection plate.

The front plate is not particularly limited. The front plate may be a glass plate or a plastic film used in producing typical mirrors. The front plate is preferably transparent in a visible light range. Here, the expression "transparent in a visible light range" means that transmittance in a visible light range is 80% or more and preferably 85% or more. The light transmittance, which is used as a standard of transparency, is light transmittance determined by the method described in JIS A5759. Specifically, the transmittance is measured at each wavelength of 380 nm or more and less than 780 nm with a spectrophotometer, multiplied by a weight value coefficient determined from the spectral distribution of CIE (International Commission on Illumination) daylight D65 and the wavelength distribution and wavelength interval of CIE spectral luminous efficiency function for photopic vision, and weight-averaged to determine the visible light transmittance. The front plate preferably has low birefringence. For example, the front phase difference may be 20 nm or less, preferably less than 10 nm, and more preferably 5 nm or less. Examples of such a plastic film include polycarbonates, acrylic resins, epoxy resins, polyurethanes, polyamides, polyolefins, cellulose derivatives, and silicones.

The front plate may have a film thickness of about 100 μm to 10 mm, preferably 200 μm to 5 mm, and more preferably 500 μm to 2 mm, and further more preferably 500 μm to 1 mm.

Adhesion Layer

The vehicle mirror having an image display function according to the present invention may include adhesion layers used for adhesion of an image display device and a circularly polarized light reflection layer, a circularly polarized light reflection layer and a front plate, and other layers. The adhesion layer may be anything if it is formed of an adhesive.

From the viewpoint of curing type, the adhesive may be of a hot-melt type, a thermocurable type, a photocurable type, a reaction-curable type, or a pressure-sensitive adhesion type without need for curing. Examples of the materials used for the types include acrylate-based, urethane-based, urethane-acrylate-based, epoxy-based, epoxy-acrylate-based, polyolefin-based, modified-olefin-based, polypropylene-based, ethylene-vinyl-alcohol-based, vinyl-chloride-based, chloroprene-rubber-based, cyanoacrylate-based, polyamide-based, polyimide-based, polystyrene-based, and polyvinyl-butyral-based compounds. From the viewpoint of workability and productivity, the photocurable type is preferable in the above curing types. From the viewpoint of optical transparency and heat resistance, acrylate-based, urethane-acrylate-based, or epoxy-acrylate-based compounds may preferably be used as the material.

Half Mirror

The half mirror can be formed of a circularly polarized light reflection layer and a front plate. The half mirror can be produced by, for example, bonding the surface of the 1/4 wavelength plate formed on a linearly polarized light reflection plate to the front plate. The circularly polarized light reflection layer and the front plate are directly bonded to each other with the adhesion layer therebetween (without other layers therebetween), thereby reducing distortion of mirror-reflected images.

Method for Producing Vehicle Mirror Having Image Display Function

The vehicle mirror having an image display function according to the present invention can be produced by disposing a half mirror on the image display surface of an image display device and integrating the image display device and the half mirror. The half mirror is disposed such that the image display device, a circularly polarized light reflection layer, and the front plate are disposed in this order. The image display device and the half mirror are integrated by connecting with an outer frame or hinges or by bonding. For example, the vehicle mirror having an image display function can be produced by bonding the surface of the circularly-polarized-light-reflection-layer-side of the half mirror including the circularly polarized light reflection layer and the front plate to the image display surface of the image display device. Integration of the image display device and the half mirror is preferably performed by bonding. In other words, the image display device and the half mirror are preferably bonded directly to each other with the adhesion layer therebetween. This is because the occurrence of a double image is likely to be prevented.

EXAMPLES

Hereinafter, with reference to Examples, the present invention will be further described. The scope of the present invention is not limited to the following Examples.

Example 1

A DBEF (registered trademark) (manufactured by 3M) was used as a linearly polarized light reflection plate. The DBEF is formed by layering PEN (polyethylene naphthalate) having birefringence and PEN having no birefringence. The surface of the DBEF (the surface of the PEN) was subjected to rubbing treatment (rayon cloth, pressure: 0.1 kgf (0.98 N), the number of rotations: 1000 rpm, moving speed: 10 m/min, the number of times: 1 reciprocation cycle) in a 45-degree direction relative to the transmission axis.

The following Compound 1, Compound 2, fluorine-based horizontal alignment agents 1 and 2, a polymerization initiator, and a methyl ethyl ketone solvent were mixed to prepare a coating solution having the following composition.

| | |
|---|---:|
| Compound 1 | 80 parts by mass |
| Compound 2 | 20 parts by mass |
| Fluorine-based horizontal alignment agent 1 | 0.1 parts by mass |
| Fluorine-based horizontal alignment agent 2 | 0.007 parts by mass |
| Polymerization initiator IRGACURE819 (manufactured by BASF) | 3 parts by mass |

Solvent (methyl ethyl ketone) the amount was determined such that the solute concentration was 30 mass %

Compound 1

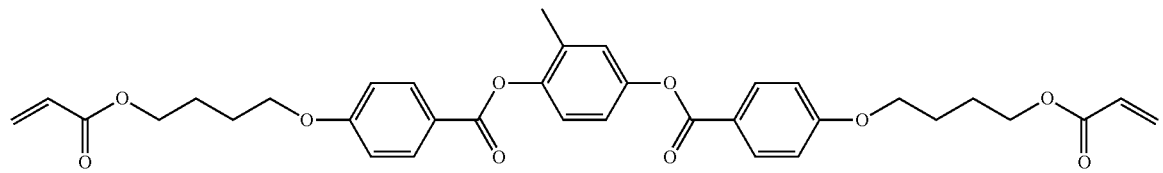

Compound 2

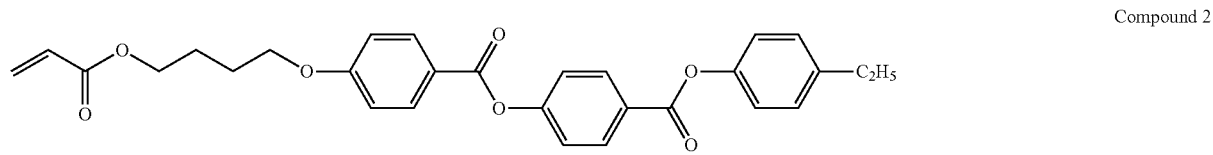

-continued

Fluorine-based horizontal alignment agent 1

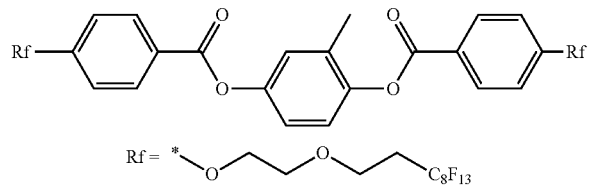

Fluorine-based horizontal alignment agent 2

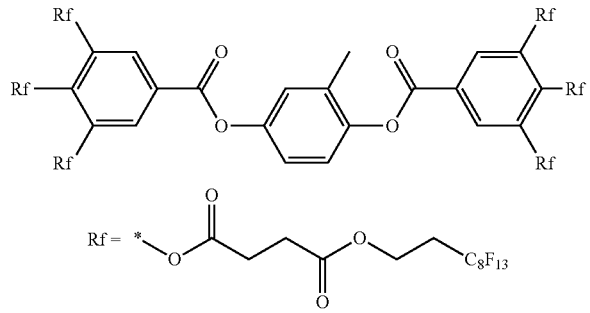

The coating solution was applied with a wire bar to the DBEF surface that had been rubbed, and the DBEF was dried. Then the DBEF was placed on a hot plate at 30° C. and irradiated with UV for 6 seconds with an electrodeless lamp "D Bulb" (60 mW/cm$^2$) manufactured by Fusion UV Systems, Inc. to fix a liquid crystal phase to thereby obtain a 1/4 wavelength plate (front phase difference: 125 nm) having a film thickness of 0.8 µm.

Example 2

A 2% N-methyl-2-pyrrolidone solution of SE-130 (Nissan Chemical Industries, Ltd.) was produced. This solution was applied with a bar to a DBEF surface that had been subjected to rubbing treatment in the same manner as in Example 1, and the DBEF was dried in an oven for 5 minutes at 100° C. and further for 60 minutes at 250° C. Then, a rubbing treatment was performed at a number or rotations of 1000 rpm to produce a DBEF substrate having an alignment layer with a film thickness of 0.5 µm.

A 1/4 wavelength plate was formed on the surface of the alignment layer in the same manner as in Example 1.

Example 3

In order to obtain an anisotropic film, deposition was conducted by using an electron-beam vacuum vapor deposition apparatus (SGC-S1700 manufactured by SHOWA SHINKU CO., LTD.), while a triacetyl cellulose (TAC) substrate was being angled relative to the vaporization source. The vaporization material was Ta$_2$O$_5$. Then, the TAC substrate surface was angled at 70° relative to the vaporization source, and deposition was conducted at a degree of vacuum of 1.0×10$^{-3}$ Pa. As a result, a thin film A formed of Ta$_2$O$_5$ having an oblique columnar structure was formed. Next, the substrate was angled so as to rotate reversely 180° around an axis perpendicular to the thin film A and to the substrate surface. Then, deposition was conducted under the same conditions as that of the thin film A to thereby obtain a thin film B having an oblique columnar structure. The deposition time is almost the same for the thin film A and the thin film B. An anisotropic film C in which the thin film A and the thin film B were layered alternately was formed. Here, the birefringence value αn of the anisotropic film C was measured. As a result, Δn=0.2 was determined.

Next, the TAC substrate was not angled and was placed parallel to the vaporization source, and Ta$_2$O$_5$ was deposited. Thus, an isotropic film D formed of Ta$_2$O$_5$ was layered on the anisotropic film C. In this way, the operation in which the anisotropic film C and the isotropic film D were layered alternately was performed for 300 times to thereby produce a linearly polarized light reflection plate having 300 layers in which anisotropic films C and the isotropic films D were alternately layered.

An alignment layer and a 1/4 wavelength plate were formed on the rear side (surface on the side opposite to the layered film) of the TAC substrate in the same manner as in Example 2.

Comparative Examples 1 and 2

An adhesive LCR0631 manufactured by Toagosei Co., Ltd. was applied with a wire bar to each surface of linearly polarized light reflection plates. Then, each of the linearly polarized light reflection plates was layered on a 1/4 wavelength plate (PURE-ACE WR (manufactured by TORN LIMITED)) using a laminator such that the slow axis of the 1/4 wavelength plate and the transmission axis of the linearly polarized light reflection plate were angled at 45° to each other. At this time, the thickness of the wire bar and the pressure of a nip roll of the laminator were adjusted to make the adhesion layer have a thickness of 4 µm. Then, the linearly polarized light reflection plate and the 1/4 wavelength plate were placed on a hot plate at 50° C. and irradiated with UV for 30 seconds with an electrodeless lamp "D Bulb" (60 mW/cm$^2$) manufactured by Fusion UV Systems, Inc. to be bonded.

Production of Vehicle Mirror Having Image Display Function

Each of the obtained half mirrors was disposed on the surface of the image display unit of a liquid crystal display (LCD) device (iPad Air (registered trademark) manufactured by Apple). The linearly polarized light reflection plate was placed to face the surface of the image display unit such that the front plate is on the side opposite to the surface of the image display unit (on the nearest side). At this time, the half mirror was disposed such that the transmission axis of the LCD and the transmission axis of the linearly polarized light reflection plate were identical to each other. In other words, the half mirror was disposed such that the slow axis of the 1/4 wavelength plate and the transmission axis of the LCD (a polarizing direction of light emitted from the LCD) were angled at 45° to each other.

Mirror-Reflected Image Distortion

A fluorescent tube in a room was observed using reflection from the front-plate side of the vehicle mirror having an image display function produced above. Visions of the fluorescent tube were evaluated with slightly changing the angle of the half mirror with a hand.

A: The fluorescent tube appears moving continuously in accordance with movement of a hand.

B: The fluorescent tube appears swaying intermittently and does not move in accordance with movement of a hand.

Image Brightness

In the vehicle mirror having an image display function, a white screen was displayed, luminance was measured, and image brightness was determined from the following equation.

Image brightness=luminance with half mirror/luminance without half mirror×100[%]

Polarizing Sunglasses Suitability

In the vehicle mirror having an image display function, a white screen is displayed and observed through polarizing sunglasses.

A: The screen is visible even when the head is bent.

B: The screen is partly invisible when the head is bent.

TABLE 1

| | Linearly polarized light reflection plate type | Process between 1/4 wavelength plate and linearly polarized light reflection plate | Mirror-reflected image distortion | Image brightness | Polarizing sunglasses suitability |
|---|---|---|---|---|---|
| Example 1 | DBEF | rubbing treatment at 45° | A | 85% | A |
| Example 2 | DBEF | formation of alignment layer | A | 85% | A |
| Example 3 | dielectric multilayer film | formation of alignment layer | A | 80% | A |
| Comparative Example 1 | DBEF | bond with adhesive | B | 85% | A |
| Comparative Example 2 | dielectric multilayer film | bond with adhesive | B | 80% | A |

What is claimed is:

1. A vehicle mirror having an age display function, comprising:
   an image display device, a circularly polarized light reflection layer, and a front plate formed of glass or plastic,
   wherein the circularly polarized light reflection layer includes a linearly polarized light reflection plate and a 1/4 wavelength plate,
   the linearly polarized light reflection plate and the 1/4 wavelength plate are directly in contact with each other without an adhesive layer disposed therebetween, or only an alignment layer is included between the linearly polarized light reflection plate and the 1/4 wavelength plate, and
   wherein the 1/4 wavelength plate is a cured layer of the liquid crystal composition including a polymerizable liquid crystal compound, and
   wherein the front plate, the 1/4 wavelength plate, the linearly polarized light reflection plate and the image display device are arranged in this order from an observer-side surface of the vehicle mirror.

2. The vehicle mirror having an image display function according to claim 1, wherein the linearly polarized light reflection plate and the 1/4 wavelength plate are directly in contact with each other.

3. The vehicle mirror having an image display function according to claim 1, wherein only an alignment layer is included between the linearly polarized light reflection plate and the 1/4 wavelength plate.

4. The vehicle mirror having an image display function according to claim 1, wherein the linearly polarized light reflection plate has a multilayer structure.

5. The vehicle mirror having an image display function according to claim 2, wherein the linearly polarized light reflection plate has a multilayer structure.

6. The vehicle mirror having an image display function according to claim 3, wherein the linearly polarized light reflection plate has a multilayer structure.

7. The vehicle mirror having an image display function according to claim 4, wherein the multilayer structure is a multilayer structure in which resins having different birefringence are layered alternately.

8. The vehicle mirror having an image display function according to claim 4, wherein the multilayer structure is a multilayer structure in which a plurality of dielectric thin films having refractive indices different from each other are layered.

9. The vehicle mirror having an image display function according to claim 1, wherein the image display device and the circularly polarized light reflection layer are directly bonded to each other with an adhesion layer disposed therebetween.

10. The vehicle mirror having an image display function according to claim 2, wherein the image display device and the circularly polarized light reflection layer are directly bonded to each other with an adhesion layer disposed therebetween.

11. The vehicle mirror having an image display function according to claim 3, wherein the image display device and the circularly polarized light reflection layer are directly bonded to each other with an adhesion layer disposed therebetween.

12. The vehicle mirror having an image display function according to claim 4, wherein the image display device and the circularly polarized light reflection layer are directly bonded to each other with an adhesion layer disposed therebetween.

13. The vehicle mirror having an image display function according to claim 7, wherein the image display device and the circularly polarized light reflection layer are directly bonded to each other with an adhesion layer disposed therebetween.

14. The vehicle mirror having an image display function according to claim 8, wherein the image display device and the circularly polarized light reflection layer are directly bonded to each other with an adhesion layer disposed therebetween.

15. The e mirror having are image display function according to claim 1, wherein the front plate and the circularly polarized light reflection layer are directly bonded to each other with an adhesion layer disposed therebetween.

16. The vehicle mirror having an image display function according to claim 1, wherein the vehicle mirror having an image display function is a vehicle rearview mirror.

17. A method for producing a vehicle mirror having an image display function, the vehicle mirror including an image display device, a circularly polarized light reflection layer, and a front plate formed of glass or plastic, wherein the circularly polarized light reflection layer includes a linearly polarized light reflection plate and a 1/4 wavelength plate, and the method includes forming the 1/4 wavelength plate from a composition that is applied directly to a surface of the linearly polarized light reflection plate without an adhesive layer disposed therebetween, or that is applied directly to a surface of an alignment layer directly in contact with the linearly polarized light reflection plate, wherein the 1/4 wavelength plate is a cured layer of the liquid crystal composition including a polymerizable liquid crystal compound, and wherein the front plate, the 1/4 wavelength plate, the linearly polarized light reflection plate and the image display device are arranged in this order from an observer-side surface of the vehicle mirror.

18. The producing method according to claim 17, comprising performing rubbing treatment to the surface of the linearly polarized light reflection plate or to the surface of the alignment layer directly in contact with the linearly polarized light reflection plate before the application.

19. The producing method according to claim 17, comprising forming the 1/4 wavelength plate from a composition applied directly to a surface of the linearly polarized light reflection plate and performing rubbing treatment to the surface of the linearly polarized light reflection plate before the application.

* * * * *